US011344920B2

(12) United States Patent
Nijland

(10) Patent No.: US 11,344,920 B2
(45) Date of Patent: May 31, 2022

(54) MEASURING DEVICE FOR MULTISPECTRAL MEASURING OF QUALITY FEATURES OR DEFECTS OF PRODUCTS AND METHOD THEREFOR

(71) Applicant: DE GREEF'S WAGEN-, CARROSSERIE-EN MACHINEBOUW B.V, Tricht (NL)

(72) Inventor: Wilhelm Jan Nijland, Veenendaal (NL)

(73) Assignee: DE GREEF'S WAGEN-, CARROSSERIE-EN MACHINEBOUW B.V, Tricht (NL)

( * ) Notice: Subject to any disclaimer, the term of this patent is extended or adjusted under 35 U.S.C. 154(b) by 156 days.

(21) Appl. No.: 16/315,135

(22) PCT Filed: Jul. 21, 2017

(86) PCT No.: PCT/NL2017/050495
§ 371 (c)(1),
(2) Date: Jan. 3, 2019

(87) PCT Pub. No.: WO2018/021908
PCT Pub. Date: Feb. 1, 2018

(65) Prior Publication Data
US 2019/0308221 A1 Oct. 10, 2019

(30) Foreign Application Priority Data
Jul. 25, 2016 (NL) ...................................... 2017235

(51) Int. Cl.
*B07C 5/342* (2006.01)
(52) U.S. Cl.
CPC ............ *B07C 5/3422* (2013.01); *B07C 5/342* (2013.01); *B07C 2501/009* (2013.01)

(58) Field of Classification Search
CPC . B07C 7/342; B07C 7/3416; B07C 2501/009; G01N 33/02
See application file for complete search history.

(56) References Cited

U.S. PATENT DOCUMENTS 4,279,346 A * 7/1981 McClure ............... B07C 5/3416
209/582
4,308,959 A * 1/1982 Hoover ................. B07C 5/3422
209/563

(Continued)

FOREIGN PATENT DOCUMENTS

| EP | 1469301 A1 | 10/2004 |
| FR | 2773220 A1 | 7/1999 |
| WO | 03023455 A1 | 3/2003 |

OTHER PUBLICATIONS

International Search Report and Written Opinion dated Dec. 1, 2017 in International Patent Application No. PCT/NL2017/050495, 9 pages.

*Primary Examiner* — Patrick H Mackey
(74) *Attorney, Agent, or Firm* — Shook, Hardy & Bacon L.L.P.

(57) ABSTRACT

The invention relates to a measuring device for multispectral measuring of products, such as vegetables and fruit, a sorting system provided therewith and a method therefor. A measuring device according to the invention comprises a frame provided with transport means for transporting the products, a camera system provided with at least one light source and at least one camera for recording an image at a frequency or frequency spectrum, and a controller operatively connected to the camera system for controlling the camera system, wherein the controller is provided with a data processing system and detection system.

20 Claims, 3 Drawing Sheets

(56) References Cited

U.S. PATENT DOCUMENTS

Figure 1:
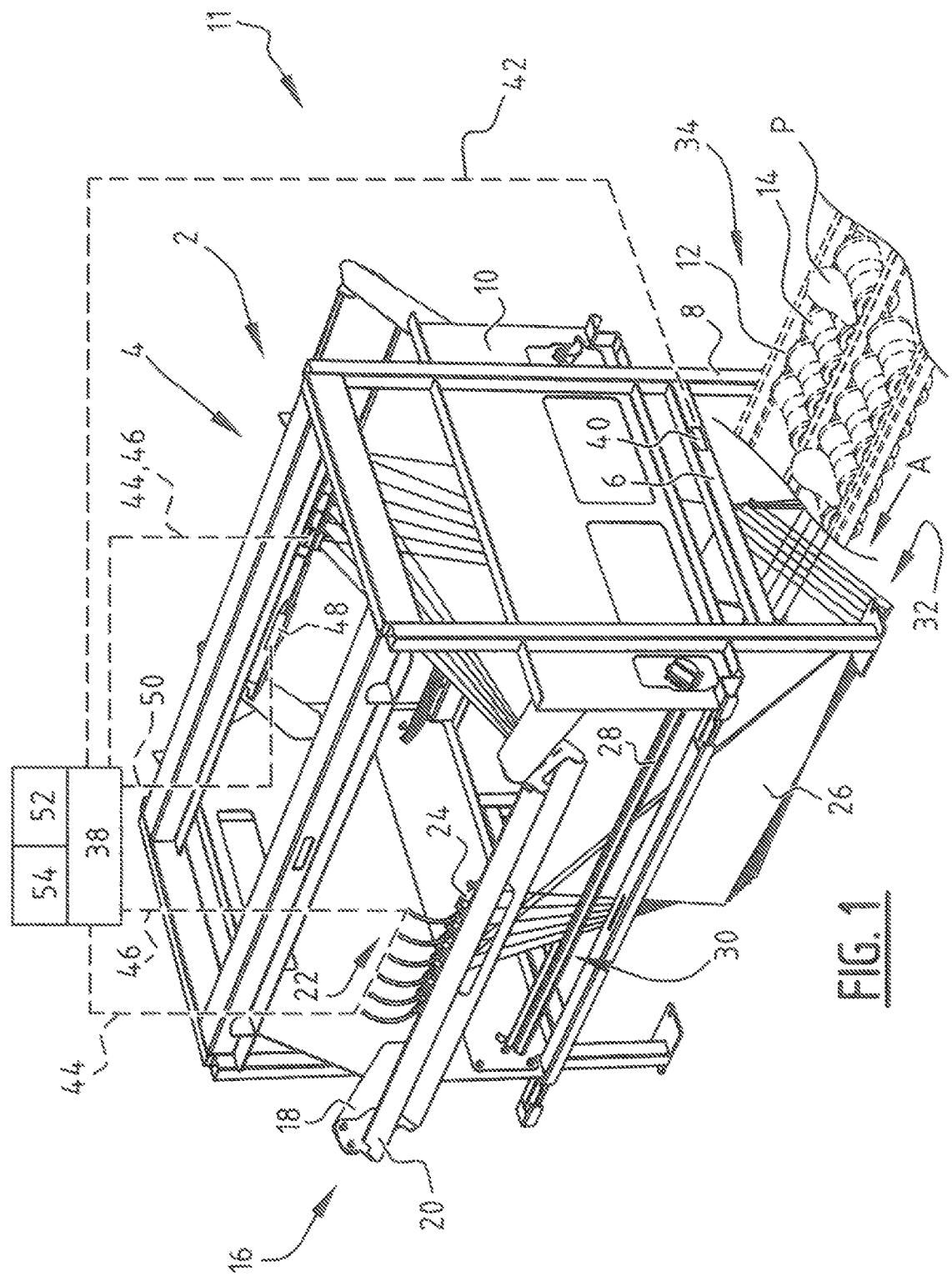

| | | | | |
|---|---|---|---|---|
| 5,164,795 A | * | 11/1992 | Conway | B07C 5/3422 |
| | | | | 250/226 |
| 5,497,887 A | * | 3/1996 | Hiebert | B07C 5/36 |
| | | | | 209/538 |
| 6,610,953 B1 | * | 8/2003 | Tao | B07C 5/342 |
| | | | | 209/11 |
| 6,888,082 B1 | | 5/2005 | Blanc | |
| 8,283,589 B2 | * | 10/2012 | Janssens | B07C 5/342 |
| | | | | 209/587 |
| 10,288,594 B2 | * | 5/2019 | Blanc | G01N 21/8806 |
| 2005/0122524 A1 | * | 6/2005 | Ibarra | B07C 5/3422 |
| | | | | 356/445 |

* cited by examiner

MEASURING DEVICE FOR MULTISPECTRAL MEASURING OF QUALITY FEATURES OR DEFECTS OF PRODUCTS AND METHOD THEREFOR

CROSS-REFERENCE TO RELATED APPLICATIONS

This application claims priority under 35 U.S.C. § 365 to PCT/NL2017/050495, filed on Jul. 21, 2017, entitled "MEASURING DEVICE FOR MULTISPECTRAL MEASURING OF QUALITY FEATURES OR DEFECTS OF PRODUCTS AND METHOD THEREFOR," which claims priority to The Netherlands App. No. 2017235 filed on Jul. 25, 2016, the entirety of the aforementioned applications are incorporated by reference herein.

The present invention relates to a measuring device for recording at a plurality of frequencies images intended for measuring quality features or defects of products, such as products in a general sense and more particularly vegetables and fruit.

Known in practice are diverse measuring devices with which products, such as vegetables and fruit, are measured. It is known inter alia here to make use of a multispectral measuring system.

One of the problems occurring here is that many data are obtained, which must be analysed. This is problematic in the case of a short available processing time, for instance in application of a measuring device for a sorting system for the purpose of sorting vegetables and fruit. Solutions hereto usually limit the frequencies used and, with this, are aimed at a specific defect for a specific product. This is therefore a limitation of flexibility for such a measuring system.

A further additional problem relates to performing a measurement during transport of the product. This means that the product is moving, and not the whole surface of the product is visible to a camera. This reduces the reliability of the measurement result, since not all quality features or defects are actually detected.

U.S. Pat. No. 5,164,795 shows a measuring device for grading the surface of (spherical) fruit. Use is made here of line scan cameras disposed one behind the other. A problem in such a measuring device is the limited accuracy of the obtained results. This is particularly problematic in natural products with irregular and varied surfaces.

U.S. Pat. No. 6,610,953 B1 shows a measuring device wherein a mid-infrared image is subtracted from a near-infrared image obtained of a product. This requires a relatively expensive camera system. In addition, not all relevant defects can be ascertained with the shown method. This therefore produces a limited indication of for instance the overall quality of the product in question.

The present invention has for its object to provide a measuring device with which the above stated problems are obviated or at least reduced, and a cost-effective measuring device which can be deployed in flexible manner and which is particularly suitable for measuring products such as vegetables and fruit is preferably obtained.

The present invention provides for this purpose a measuring device according to claim 1 for measuring quality features or defects of products such as vegetables and fruit.

The transport means move the product along or over a transport path. The transport means are for instance diabolos. It is also possible to apply other transport means, such as brushes. An advantage of using diabolos is that they allow rotation of the product during transport, such that a plurality of sides of the product are directed toward a camera during the movement.

Providing a camera system enables an image of the product to be recorded. Provided for this purpose using a light source is light having a specific frequency and/or specific frequency spectrum at which a camera records an image. Owing to the use of a controller in the measuring device the measuring procedure can be put into practice using the camera system. According to the invention, the controller is configured for this purpose to send a first measuring instruction to the camera system. The camera system performs a first measurement on the basis of the received measuring instruction by activating both the light source and the camera. An image of the product is recorded here at at least two frequencies or frequency spectra on the basis of the first measuring instruction. Although it is possible to record a single image applying two or more frequencies or frequency spectra, for instance using a hyperspectral camera, it is currently preferred to record a single image of the product using a camera at an individual frequency or an individual spectrum.

The controller is further configured to send a second measuring instruction to the camera system. Upon receiving this second measuring instruction, the camera system will activate a light source and camera for recording a second image of the product, once again at two or more frequencies and/or frequency spectra which are substantially equal to the frequencies and/or frequency spectra in the first measurement. Between the first measuring instruction and the second measuring instruction the product has been moved by the transport means and has moved from a first measuring point or measuring path to a second measuring point or measuring path. This achieves that, besides having been displaced, the product has also been rotated by the transport means and a different side thereof will face toward the camera. A full analysis of substantially the whole surface of the product can be obtained hereby, also in the case of irregularly formed products, for instance pears. Multiple measuring instructions can if desired be executed. If desired, it is also possible according to the invention to send multiple measuring instructions in combined form to the camera system with the controller, such that the camera system records at a first and at a second measuring point or measuring path at least an image of the product at at least two frequencies or frequency spectra. With this, at least two images are recorded, each with the product in a different position.

According to the invention, the camera system is further operatively connected to the data processing system with which a product overview image can be composited per frequency or frequency spectrum. This product overview image is then analysed by the detection system which is operatively connected to the data processing system, such that a quality feature or defect on or in the product can be detected. Such a detection system can be formed by an analysis system or comprise such an analysis system. Compositing a product overview image enables an analysis to be carried out over the whole surface of the product. According to the invention, a physical overview image can be formed which is then processed further by the detection system and/or analysis system, or a virtual overview image can be formed wherein data are processed immediately by dividing/multiplying data or performing other operations, and then providing an overall image.

In a currently preferred embodiment the measuring device according to the invention makes use of so-called area scan cameras, wherein each recording shows a (i.e. the most complete possible) picture/image of the fruit. In recordings with a plurality of frequency bands the spatial information of the whole fruit is therefore available per frequency band. The images of the different frequency bands can hereby be projected precisely onto each other, after which an analysis can be carried out per pixel on the basis of the information from the images of the different frequency bands. According to the invention, it is possible to record images successively and/or simultaneously in two or more frequencies or frequency spectra, also referred to as frequency bands. For classifying the pixels, this for the purpose of detecting for instance defects, use is further made of analysis techniques such as neural networks, principal component analysis, linear discriminant analysis, principal component regression, partial least squares and so on, wherein the separating planes between the different classes of a so-called classifier do not necessarily pass through the origin.

The measuring device preferably further comprises a second camera system which is arranged on the frame for recording images of a different side of the product than with the first camera system. This achieves that an even more complete overview of the whole surface of the product can be obtained. This further increases the reliability of the measurement.

Product features and defects can relate to different aspects. Examples hereof are for instance firmness in kiwis, soft spots just below the surface of the product, sugar content, detection of browning in pears, soft spots in peaches, internal damage in kiwis, cork spot in pears. It will be apparent that other defects can also be measured.

The invention can be applied particularly advantageously in the case of defects or quality features which are visible by combining information at different frequencies, for instance cork spots in pears and soft spots below the surface in peaches.

The data processing system forms a product overview image by combining the individual images and correcting them for overlap. Such a process is also referred to as mapping. The data processing system makes use of the product overview image to recognize quality features or defects.

In one of the currently preferred embodiments the data processing system makes a comparison on the basis of images and thresholds so as to determine whether a specific defect is occurring. Particularly in the case of a defect which is visible only by combining information at a plurality of frequencies or from a plurality of frequency spectra is it necessary in all these frequencies or frequency spectra to meet an exceedance, in the form of a comparison with for instance a threshold value, occurring in accordance with the relevant defect. If all relevant thresholds are exceeded, such a complex defect is occurring, which can then be established by the measuring device. If desired, use can additionally or alternatively be made of a different detection method.

The obtained measurement results per product are preferably transmitted by the measuring device, and for instance used for sorting the products, for instance with a sorting system.

An additional measurement, for instance a fluorescence measurement, is optionally performed at a measuring point. By performing an additional measurement further information about the product is obtained.

In an advantageous preferred embodiment according to the present invention the camera system of the measuring device also comprises a further camera for recording an image at a second and optionally further frequency.

Providing a second camera per camera system makes it possible to obtain an accurate image at a specific frequency or frequency spectrum. It is thus for instance possible to configure a first camera specifically for a specific frequency and to configure a second or optional further camera specifically for a different frequency.

In a currently preferred embodiment according to the invention four, five or six cameras, which are specifically aimed at specific frequencies or frequency spectra, are provided per camera system. If a camera system is provided on either side of the transport path of the product, both camera systems are preferably provided in this embodiment with a plurality of individual cameras. This has the advantage that a specific measurement can be obtained, wherein the occurrence of interference or measurement disruptions caused by measurement at other frequencies is prevented. This is preferably realized by providing the individual cameras with a specific filter. By applying such a specific filter the image obtained with the specific camera is aimed at the specific frequency. This significantly increases the accuracy of the obtained image. By applying a plurality of cameras per camera system useful information can be obtained per frequency, so that a product feature or defect can be detected in efficient manner, for instance by combining information from different cameras. An additional advantage is that applying a plurality of cameras, preferably provided with a specific frequency filter, per camera system provides a relatively cost-effective camera system. Such a camera system can also be modified in relatively simple manner for a different application, for instance a different type of product and/or different quality feature or defect.

When a plurality of cameras is used per camera system, an image is preferably generated substantially simultaneously for each frequency or frequency spectrum using each individual camera. This particularly simplifies the so-called mapping and/or enables a more accurate image of the product to be obtained. If desired, it is possible to combine images of a plurality of frequencies in order to view defects which can only be detected sufficiently accurately by combining images at a plurality of frequencies/spectra.

In an advantageous embodiment according to the invention the camera systems or the camera system or individual cameras can be mounted on a carrier, such that a three-dimensional image of the product can be obtained in effective manner A 3D image of the product can for instance be obtained using a stereo measurement, wherein for instance two cameras of a camera system in principle simultaneously record an image of the product from different directions. Such a carrier can optionally be provided movably, for instance in order to adapt it to the type of product to be measured, or can even co-displace during transport of the product.

In an advantageous embodiment according to the invention the controller is configured to send at least ten measuring instructions per product.

By providing a controller with which at least ten and preferably even more measuring instructions are sent per product, ten product images are obtained per frequency. Because the measuring instructions are given during movement of the product, the different product images are obtained with different orientations of the product. This makes it possible to obtain a product overview image, so that the accuracy of the eventual detection is increased.

The measuring instructions for measuring the product are preferably executed within a time period of 0.5 seconds, and more preferably within a time period of 0.2 seconds, so as to thereby provide sufficient capacity for the measuring device. It is possible here to deploy the camera systems simultaneously to record images of a product on more than one transport path or product track. In one of the currently preferred embodiments a measuring device is applied to two parallel product tracks. A camera system can hereby be utilized effectively so that a still more favourable embodiment is obtained.

The measuring device according to the invention is preferably provided with an illuminator, and preferably provided herein with a number of LEDs. On the basis of the measuring instruction some of the LEDs are activated, and others are preferably activated contiguously in order to obtain a product image at a different frequency therewith. As an alternative to applying LEDs with specific frequencies or frequency spectra, use can also be made of a more conventional halogen lighting with which multiple frequencies are emitted.

An illuminator is preferably applied in combination with camera systems comprising a plurality of cameras provided with filters for obtaining information aimed at specific frequencies or frequency spectra. Such a lighting realized with an illuminator can alternatively also be applied in combination with a hyperspectral camera, with which information about for instance 25 frequencies is obtained per optionally composite pixel. Such a camera provides information about a relatively large number of frequencies, usually at a relatively high pixel size.

The camera system, and preferably the illumination thereof, is preferably surrounded by a housing. The illumination can hereby be shielded from the surrounding area in effective manner, so that disruptions from the surrounding area, which may affect the measurement, are avoided. This benefits the accuracy of the measurement.

In a further preferred embodiment according to the present invention the camera system comprises an infrared or near-infrared sensor and/or an RGB camera.

Further information about the product is obtained by providing an additional sensor with infrared or near-infrared spectrum. This is likewise the case for application of an RGB camera, wherein further information can be obtained or wherein such a camera can function as reference. With this, more information is obtained and/or the reliability of the obtained measurements is increased.

The invention further also relates to a sorting system provided with a measuring device as described above.

Such a sorting system provides the same effects and advantages as described for the measuring device. In addition to a measuring device, the sorting system preferably comprises a singulator and a sorting device with sorting outlets. A complete processing line is hereby obtained with which products can be supplied in bulk and, after singulation, measurement and classification, are sorted for the purpose of further processing, including storage.

The invention further also relates to a method according to claim 13 for measuring quality features or defects in products such as vegetables and fruit.

The method provides similar effects and advantages as described for the measuring device and/or the sorting system. With the method the product overview image for different frequencies or frequency spectra can be obtained in effective manner. It is preferable for the frequencies or frequency spectra in the first and the second measurement to substantially correspond at least partially. An additional measurement is optionally performed at a measuring point, for instance a stereo measurement for obtaining a 3D image and/or for instance a fluorescence measurement. A quality feature or defect can hereby be detected in effective manner Such a product image is evaluated on the basis of the product overview images associated with more than one frequency or frequency spectrum. A defect can hereby for instance be detected in efficient manner by making use of information from a plurality of frequencies or frequency spectra.

In a currently preferred embodiment use is made here of a plurality of cameras for recording an image for one frequency per camera. Information which is accurate and wherein disruption by other frequencies is prevented can be collected in effective manner from such a specific camera.

Figure 2:
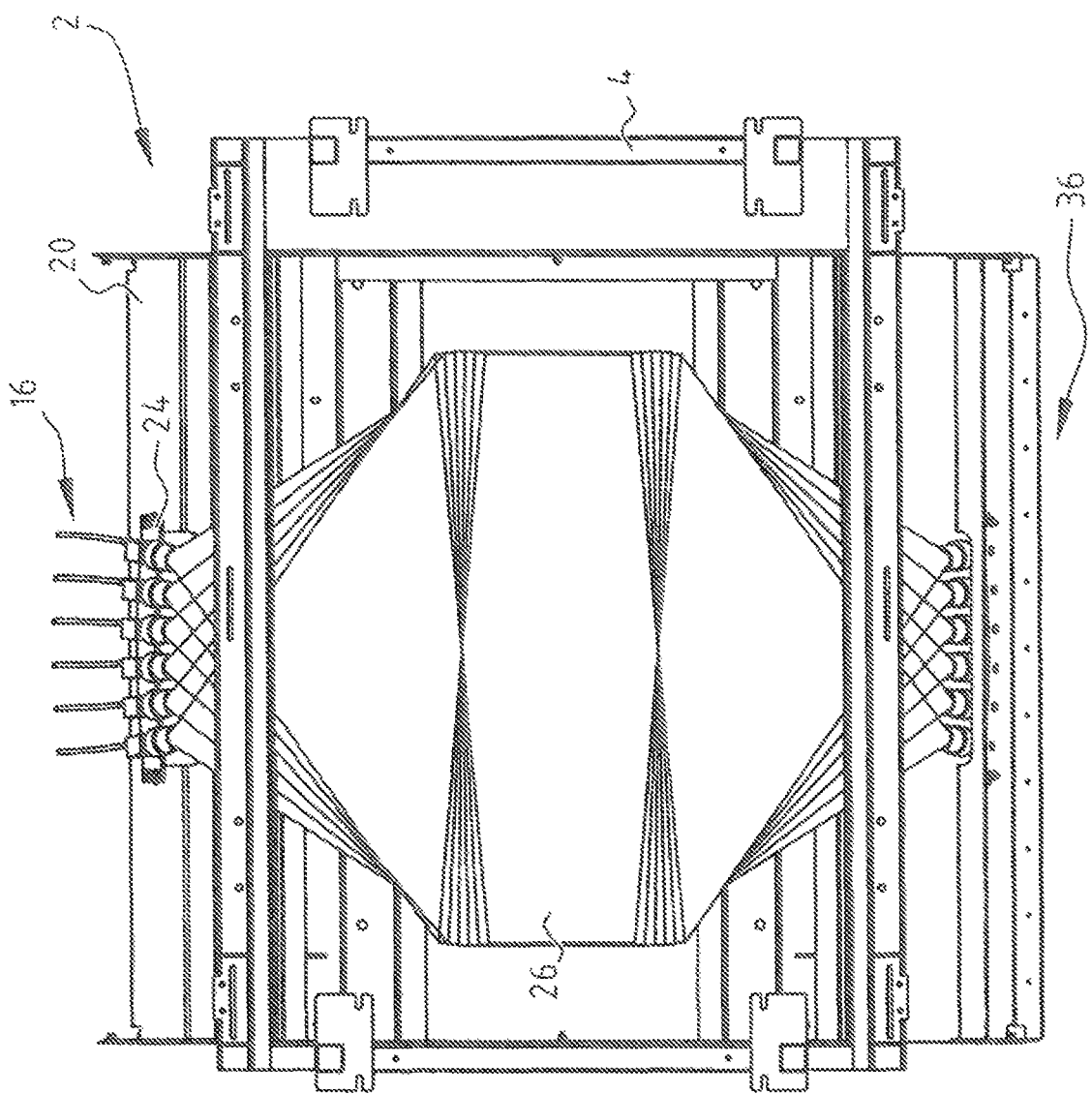
Figures 3A, 3B, 3C, 3D, 3E:
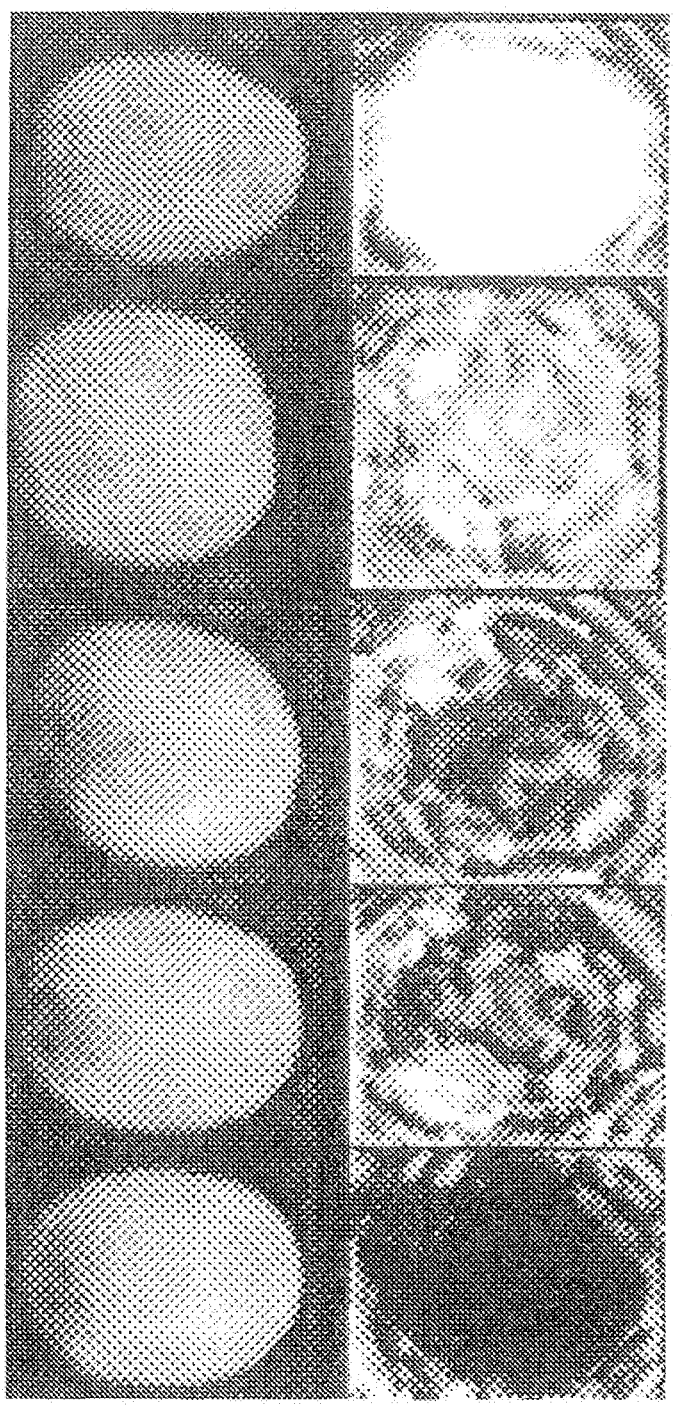

Further advantages, features and details of the invention are elucidated on the basis of the preferred embodiments thereof, wherein reference is made to the accompanying drawings, in which:

FIGS. 1 and 2 show views of a measuring device according to the invention; and FIG. 3 shows views of product images obtained with a measuring device of FIGS. 1 and 2.

Measuring device 2 (FIGS. 1 and 2) comprises frame 4 provided with a number of beams 6 and uprights 8, wherein casing or housing 10 is provided. Feet or mounting plates are used to place measuring device 2 on for instance a sorting system 11 comprising guides 12 and diabolos 14 with which products P are transported in direction A. It will be apparent that sorting system 11 can also be formed in other manner, for instance with brushes.

Measuring device 2 is provided with first camera system 16 comprising or mounted on one or more plates or supports 18 which are arranged on either side of measuring device 2. Mounting beam 20 extends between supports 18. Mounting beam 20 carries first camera set 22 comprising a number of cameras 24. Cameras 24 are provided with line of sight or operating range 26. First camera system 16 is further provided with lighting beam 28 which in the shown embodiment extends over substantially the whole length of measuring device 2. In the shown embodiment a number of groups of LEDs 30 is arranged on beam 28.

In the shown embodiment measuring device 2 is suitable for measuring first track 32 and second track 34, which are arranged parallel to each other in this embodiment. It will be apparent that a different number of tracks can also be applied, for instance one, three, four or more.

First camera system 16 records images of a first side of product P. In the shown embodiment measuring device 2 is further provided with second camera system 36 on the other longitudinal side of measuring device 2 for measuring the other side of product P. In the shown embodiment the two camera systems 16, 36 are used to measure products P on first track 32 and on second track 34. Controller 38 of measuring device 2 receives information about approaching products P from product detector 40 via measuring signal 42. Control signal 44 is sent to first camera system 16 and/or second camera system 36 partially on the basis thereof. Control signal 44 controls cameras 24 and LEDs 30 in desired manner Measuring signals 46 are fed back to controller 38. Another type of sensor or camera 48 is optionally also arranged, for instance NIR sensor or RGB camera 48. Measuring signal 50 coming from sensor or camera 48 is likewise fed back to controller 38. Data processor 52 obtains information from controller 38 for compositing product images into product overview images. Product features or defects are then detected in product P in analysis system 54. The obtained end result can be carried to a sorting system or a comprehensive control system. It will be apparent that a different configuration for controller 38, data processor 52 and analysis system 54 is also possible, for instance central or local and for instance separate or integrated.

When a product P arrives at measuring device 2, product detector 40 will send measuring signal 42 to controller 38. Controller 38 will send a first measuring instruction or control instruction 44 to camera systems 16, 36, whereby a measurement protocol is activated for LEDs and cameras 24. In the shown embodiment the different LEDs 30 are activated at different frequencies and the corresponding camera 24, preferably provided with a specific filter, is activated for recording a product image. Measuring signals 46 are fed back to controller 38.

A second control signal 44 is then sent to camera systems 16, 36 for performing a measurement wherein products P have been moved along by transport means 14 and wherein an individual product P has rotated to some extent so that a different part of the product surface faces toward cameras 24. The same measuring procedure is preferably followed here.

Controller 38 can then be configured to send additional measuring instructions, for instance ten measuring instructions per product P during the measuring path of product P through measuring device 2. In the shown embodiment product P is here transported on the underside of beam 6 between the two posts 8 on either side of measuring device 2.

From the product images, data processor 52 generates the product overview images which are then converted in analysis system 54, and wherein product features or defects are detected.

In an experiment product images (FIG. 3, top row) have been recorded and a degree of ripeness has been determined on the basis of a grayscale value (FIG. 3, bottom row), enabling for instance a good classification and/or sorting. In this experiment measurements have been performed with 25 wavelength bands in the range of 675-975 nm. The ripeness value of the kiwis was coupled to this image information. An objective destructive measuring method (for instance measurement with a penetrometer) was applied to determine the ripeness value. Using a correlation algorithm a model was then generated for the relation between the image information and the ripeness value. In the experiment the ripeness value which is ultimately determined in non-destructive manner by measuring device 2 was scaled between 0 and 255 in order to obtain a grayscale value image. In the shown experiment it has been found that a reliable detection of ripeness can be obtained in effective manner.

The present invention is by no means limited to the above described preferred embodiments thereof. The rights sought are defined by the following claims, within the scope of which many modifications can be envisaged.

The invention claimed is:

1. A measuring device for measuring quality features or defects of products, comprising:
 a frame provided with a transport for transporting the products;
 a camera system provided with at least one light source and at least one camera for recording an image at a frequency or a frequency spectrum, wherein the at least one camera comprises an area scan camera, and wherein the at least one light source illuminates at multiple frequencies at which the at least one camera records;
 a controller operatively connected to the camera system for controlling the camera system, the controller configured to activate the at least one camera and the at least one light source such that the at least one light source illuminates at the multiple frequencies, wherein the controller is configured such that during a measuring procedure:
   a first measuring instruction is sent to the camera system for performing a first measurement by recording at least one image of the product at at least two frequencies or frequency spectra included in the multiple frequencies, and
   at least a second measuring instruction is sent to the camera system for performing a second measurement by recording at least one image of the product at at least two frequencies or frequency spectra included in the multiple frequencies, which are substantially equal to the at least two frequencies or frequency spectra of the first measurement,
   wherein the product is moved by the transport from a first measuring point or measuring path associated with the first measuring instruction to a second measuring point or measuring path associated with the second measuring instruction;
 a data processing system operatively connected to the camera system and configured to composite a multispectral product overview image using the first measurement and the second measurement; and
 a detection system operatively connected to the data processing system and configured to detect a quality feature or defect on or in the product on the basis of at least the multispectral product overview image.

2. The measuring device of claim 1, wherein the camera system comprises a first camera system, and wherein the measuring device further comprises a second camera system arranged on the frame for recording images of a different side of the product than with the first camera system.

3. The measuring device of claim 2, wherein the camera system comprises a first camera for recording an image at a first frequency or frequency spectrum and a second camera for recording an image at a second frequency or frequency spectrum substantially simultaneously with the first camera, and wherein each camera of the camera system is provided with a specific frequency filter.

4. The measuring device of claim 3, wherein the detection system for detecting a quality feature or defect on or in the product makes use of measurement information at a plurality of frequencies.

5. The measuring device of claim 3, wherein the at least one light source comprises an illuminator with at least 100 LEDs.

6. The measuring device of claim 4, wherein the at least one light source comprises an illuminator with at least 100 LEDs.

7. The measuring device of claim 1, wherein the camera system comprises a first camera for recording an image at a first frequency or frequency spectrum and a second camera for recording an image at a second frequency or frequency spectrum substantially simultaneously with the first camera.

8. The measuring device of claim 7, wherein each camera of the camera system is provided with a specific frequency filter.

9. The measuring device of claim 1, further comprising a carrier on which the at least one camera can be mounted such that a three-dimensional image of the product can be obtained.

10. The measuring device of claim 1, wherein the detection system for detecting a quality feature or defect on or in the product makes use of measurement information at a plurality of frequencies.

11. The measuring device of claim 1, wherein the controller is configured to send at least 10 measuring instructions per product, and wherein the measuring instructions for a single product are executed within a time period of 0.5 seconds.

12. The measuring device of claim 1, wherein the at least one light source comprises an illuminator with at least 100 LEDs.

13. The measuring device of claim 1, wherein the data processing system composites each multispectral product overview image through mapping during which individual images are combined and corrected for overlap.

14. The measuring device of claim 1, wherein the camera system comprises a hyperspectral camera, and wherein the camera system is surrounded by a housing.

15. The measuring device of claim 1, wherein the camera system comprises an infrared or near-infrared sensor and/or an RGB camera.

16. The measuring device of claim 1, further comprising a sorting system provided with the measuring device.

17. A method for measuring quality features or defects on or in products, the method comprising:
    positioning a camera system on a frame of a measuring device, wherein the camera system includes at least one light source and at least one camera for recording an image, wherein the at least one camera comprises an area scan camera, and wherein the at least one light source illuminates at multiple frequencies at which the at least one camera records;
    moving a product for measuring using a transport;
    controlling the camera system with a controller configured to activate the at least one camera and the at least one light source such that the at least one light source illuminates at the multiple frequencies, wherein the controlling comprises:
        sending a first measuring instruction and recording at least one image of the product at at least two frequencies or frequency spectra included in the multiple frequencies at a first measuring point and/or during a first measuring path, and
        sending at least a second measuring instruction and recording at least one image of the product at at least two frequencies or frequency spectra included in the multiple frequencies at a second measuring point and/or during a second measuring path,
        wherein the second measuring point and/or the second measuring path differs at least partially from the first measuring point and/or the first measuring path;
    compositing a multispectral product overview image using the at least one image recorded in response to the first measuring instruction and using the at least one image recorded in response to the second measuring instruction; and
    detecting quality features or defects on or in the product using a detection system that analyzes at least the multispectral product overview image.

18. The method of claim 17, further comprising evaluating the multispectral product overview image for defects on the basis of images recorded at more than one frequency or frequency spectrum.

19. The method of claim 18, further comprising using a plurality of cameras to record an image at one frequency per camera on the basis of a measuring instruction.

20. The method of claim 17, further comprising using a plurality of cameras to record an image at one frequency per camera on the basis of a measuring instruction.

* * * * *